(12) United States Patent
Nemoto et al.

(10) Patent No.: US 6,690,283 B2
(45) Date of Patent: Feb. 10, 2004

(54) PROTECTIVE DEVICE AND COMMUNICATION DEVICE

(75) Inventors: Fujio Nemoto, Kanagawa (JP); Waichi Horiuchi, Tokyo (JP); Tadamichi Koike, Tokyo (JP)

(73) Assignees: Sony Corporation, Tokyo (JP); Nakayo Telecommunications, Inc., Tokyo (JP)

( * ) Notice: Subject to any disclaimer, the term of this patent is extended or adjusted under 35 U.S.C. 154(b) by 20 days.

(21) Appl. No.: 09/922,123

(22) Filed: Aug. 3, 2001

(65) Prior Publication Data

US 2002/0048134 A1 Apr. 25, 2002

(30) Foreign Application Priority Data

Aug. 4, 2000 (JP) ..................................... P2000-236638

(51) Int. Cl.⁷ .............................................. G08B 21/00
(52) U.S. Cl. .................. 340/664; 340/659; 340/309.15; 361/1
(58) Field of Search ................. 340/664, 660, 340/661, 662, 663, 638, 309.15, 659; 361/1, 600, 679; 324/500

(56) References Cited

U.S. PATENT DOCUMENTS

| | | | | |
|---|---|---|---|---|
| 4,039,932 A | * | 8/1977 | Duckworth | 324/28 R |
| 4,583,086 A | * | 4/1986 | Andrews et al. | 340/640 |
| 4,912,590 A | * | 3/1990 | Misencik et al. | 361/56 |
| 5,444,380 A | * | 8/1995 | Bourgeois et al. | 324/529 |
| 5,768,081 A | * | 6/1998 | Cohen et al. | 340/119 |
| 5,790,359 A | * | 8/1998 | Kapp et al. | 361/106 |
| 6,122,157 A | * | 9/2000 | Gerlach | 361/124 |
| 6,157,529 A | * | 12/2000 | Ahuja | 361/111 |
| 6,369,999 B1 | * | 4/2002 | Wohlgemuth et al. | 361/111 |

* cited by examiner

*Primary Examiner*—Daniel J. Wu
*Assistant Examiner*—Phung Nguyen
(74) *Attorney, Agent, or Firm*—Jay H. Maioli

(57) ABSTRACT

An apparatus to indicate a state where a communication device connected to a communication wire and a power line is protected from a surge current. A toroidal coil picks up a rapid increase of current caused by a rapid increase of voltage that occurs in the communication wire and/or the power line. The toroidal coil is connected to the current detecting unit. The current detecting unit converts the current from the toroidal coil into a voltage and supplies it to a switching circuit. The switching circuit turns on an indicator light circuit to light up an LED of the indicator light circuit.

10 Claims, 3 Drawing Sheets

PROTECTIVE DEVICE AND COMMUNICATION DEVICE

BACKGROUND OF THE INVENTION

1. Field of the Invention

The present invention relates to a protective device which protects various communication devices, for example, connected to a power line and a communication wire such as a telephone line, from a rapid increase of current due to a rapid increase of voltage in the communication wire and the power line induced by thunder, and relates to a communication device with the above protective device mounted thereon.

2. Description of the Related Art

Various communication devices used by connecting themselves to a communication wire such as a telephone line or used by connecting themselves to a power line for receiving power, for example, to a commercial AC (alternating current) outlet, are used in order to establish a connection of a communication line. For example, there are a telephone, a facsimile machine, a TA (Terminal Adapter), a personal computer with a communication function built in, and so on.

Various protective devices are provided in order to protect these communication devices from a rapid increase of current (serge current) caused by a rapid increase of voltage induced in a communication wire and a power line by thunder. The protective device is to prevent the surge current flowing into a communication device, and when an excessive surge current flows in a power line and a fuse in the protective device is broken, that one having an indicator showing that a fuse has been broken is provided.

More concretely, the protective device is provided with a LED (Light Emitting Diode) for indicating a current-carrying state. When a fuse in the protective device is broken, the LED goes out. This notifies a user that an excessive surge current flows in a power line, thereby blowing the fuse in the protective device. The shutoff of the LED when the fuse is broken can inform a user that the communication device can be protected from the surge current caused by thunder, thereby inducing a user to exchange a fuse in the protective device with a new one.

As mentioned above, when an excessive surge current occurs, thereby breaking a fuse connected to a power line, the protective device for protecting a communication device from the surge current caused by thunder notifies a user that the fuse has been broken, in a way of shutting off the LED for indicating a current-carrying state.

In the case of a surge current within the range of normal operation of the protective device, not such a large surge current as to break a fuse of the protective device, it is impossible to notify a user through the protective device that the communication device is protected. Therefore, a user may worry about whether the protective device operates normally or not.

As long as such an excessive surge current as to break a fuse of the protective device does not flow, it is impossible to show the validity of the protective device which protects a communication device from thunder, to a user. Therefore, the protective device cannot attain reliability and satisfaction of a user to the full.

Taking the above into consideration, the present invention aims to provide a protective device capable of notifying the state of protecting a communication device connected to a communication wire and a power line from a rapid increase of current, and a communication device with the above protective device mounted thereon.

SUMMARY OF THE INVENTION

In order to solve the above problem, a protective device according to a first aspect of the present invention is a protective device which connects a communication device to a communication wire and a power line and protects the communication device from a rapidly increasing current due to a rapid increase of voltage induced in the communication wire and/or the power line, comprising:

informing means for informing the operation of a protective function when the protective function operates due to a rapid increase of current;

current change detecting means for detecting a rapid increase of current which occurs in the communication wire and/or the power line; and control means for controlling the operation of the informing means based on the detection output from the current change detecting means.

According to the protective device of the first aspect of the present invention, the current change detecting means detects a rapid increase of current caused by a rapid increase of voltage which occurs in a communication wire and/or a power line connected to a communication device. When the current change detecting means detects a rapid increase of current, the control means controls the informing means to operate depending on the detection output, thereby informing a user that a protective function operates.

Thus, when the protective device operates to protect a communication device if there occurs a rapid increase of current flowing in the communication wire or the power line, due to thunder, even not so large as to break a fuse of the protective device and to break the protective device, the protective device of the present invention can notify a user of that.

A protective device according to a second aspect of the present invention is the protective device of the first aspect, wherein the current detecting means has a toroidal coil and the communication wire and the power line corresponding to portions where occurrence of a rapid increase of current is to be detected are passed through a core of the toroidal coil.

According to the protective device of the second aspect of the present invention, the current change detecting means is formed by so-called a toroidal coil (ring coil) made by wrapping a wire around a ring core portion, and the communication wire and the power line corresponding to the portions where occurrence of a rapid increase of current is to be detected are passed through the ring core portion of the toroidal coil.

Thus, it is possible to detect a rapid increase of current in the predetermined portions sensitively and surely and inform a user that a protective function operates or has operated, easily.

A protective device of a third aspect of the present invention is the protective device of the first aspect, wherein the informing means is formed by using a light-emitting element, and the control means controls the light-emitting element to light up for a constant hour when a rapid increase of current is detected by the current change detecting means.

According to the protective device of the third aspect of the present invention, the informing means is formed by a light-emitting element, for example, LED and so on, and when the current change detecting means detects a rapid increase of current, the light-emitting element as the informing means is controlled to light up for a constant hour by the control means.

Thus, when a rapid increase of current occurs and the protective function operates, the light-emitting element lights up for a constant hour, thereby informing a user that the protective function is operating to protect the communication device, surely and easily.

A protective device of a forth aspect of the present invention is the protective device of the first aspect, wherein the informing means is formed by using a light-emitting element, instruction receiving means for receiving a shutoff instruction from a user is provided, and the control means controls the light-emitting element to light up until receiving the shutoff instruction through the instruction receiving means when a rapid increase of current is detected by the current detecting means.

According to the protective device of the forth aspect of the present invention, the informing means is formed by a light-emitting element, for example, LED and so on, and when the current change detecting means detects a rapid increase of current, the light-emitting element as the informing means is controlled by the control means to light up and to keep lighting up until receiving a shutoff instruction of the LED through the instruction receiving means.

Thus, when a rapid increase of current occurs and the protective function operates, the light-emitting element can be kept lighting up until receiving an instruction, thereby informing a user that the protective function operates to protect a communication device, surely and clearly.

A protective device of a fifth aspect the present invention is the protective device of the first aspect, further comprising:

count means for counting the detection times of rapid increase of current by the current change detecting means; and count value output means for supplying count value by the count means.

According to the protective device of the fifth aspect of the present invention, when the current change detecting means detects a rapid increase of current, the count means starts counting to count the detection times of rapid increase of current. The count value by the count means is provided to a user through the count value output means, for example, LCD, a rotating count display unit mechanically formed, or the like. Thus, a user can correctly know how many times a rapid increase of current occurs, and he or she can know the validity of the protective device surely.

DETAILED DESCRIPTION OF THE PREFERRED EMBODIMENTS

Figure 1:
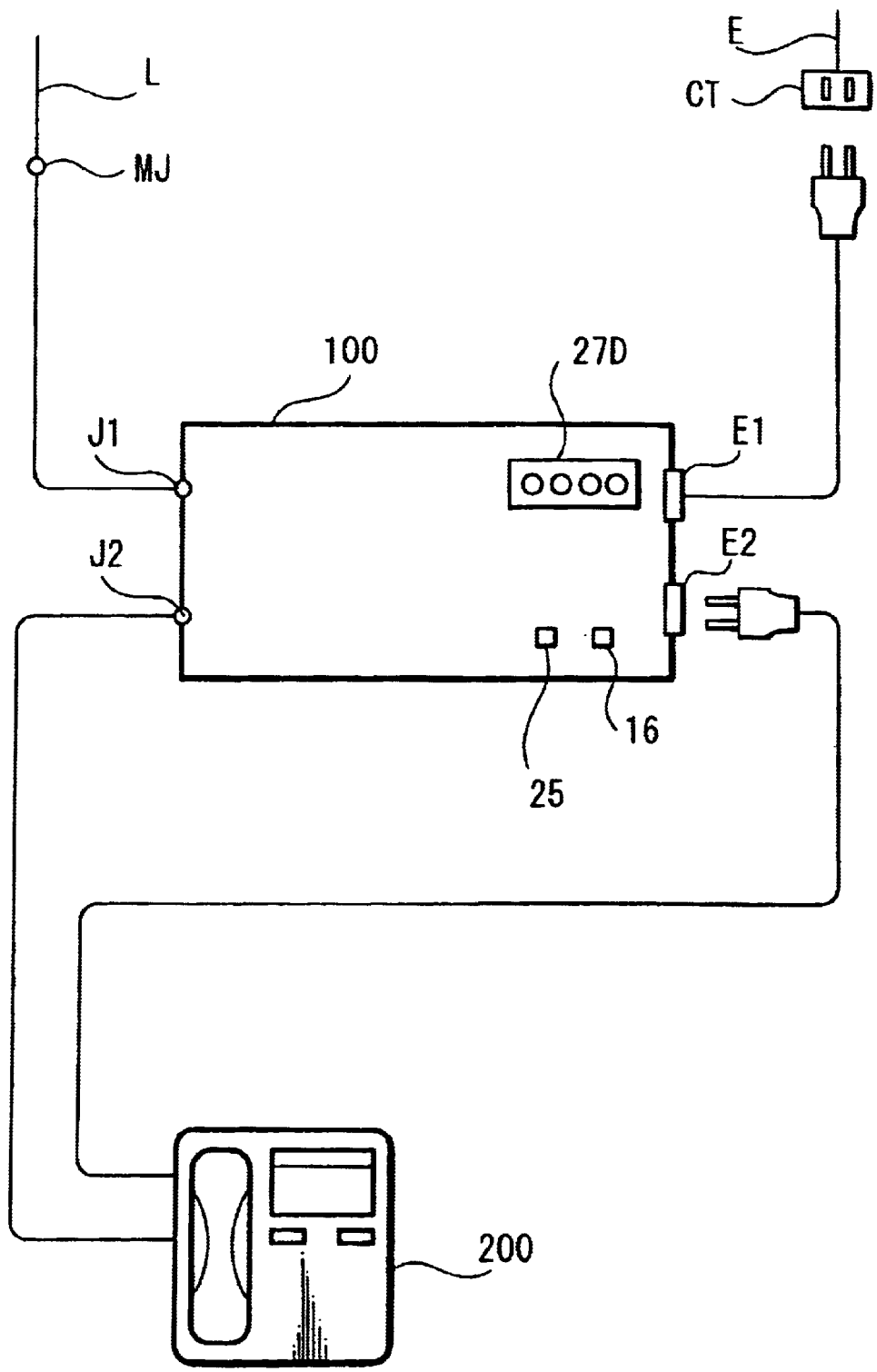
FIG. 1 is a view for describing a using state of a protective device according to an embodiment of the present invention.

Hereinafter, an embodiment of a protective device and a communication device according to the present invention will be described with reference to the drawings. FIG. 1 is a view for describing the embodiment of the protective device according to the present invention.

As illustrated in FIG. 1, the protective device 100 of the embodiment is designed in a form of adapter so as to connect a communication device (a telephone in this example) 200 to a communication wire (telephone line in this example) L drawing from a communication network to an inside modular jack MJ and a power line E of commercial power supply drawing from outside to a commercial power outlet (AC (alternating current) outlet) CT.

The protective device 100 is able to protect a surge current caused by a surge voltage in the communication wire and/or the power line induced by thunder from flowing to the communication device 200, thereby protecting the communication device 200 from the surge current.

As illustrated in FIG. 1, the protective device 100 comprises two connection terminals J1 and J2 for a communication wire and two connection terminals E1 and E2 for a power line. The connection terminal J1 for a communication wire is to connect the protective device 100 to the communication wire L through the modular jack MJ. The connection terminal J2 for a communication wire is to connect the communication terminal 200 to the communication wire L through the protective device 100.

The connection terminal E1 for a power line is to connect the protective device 100 to the AC outlet CT. The connection terminal E2 for a power line is to connect the communication terminal 200 to the power line E through the protective device 100. That is, the connection terminal E1 is a connection terminal for alternating current input (AC IN) and the connection terminal E2 for a power line is a connection terminal for alternating current output (AC OUT).

The protective device 100 of the embodiment comprises a LED 16 for informing, for example, that it is in a current-carrying state and a LED 25 for informing a surge current when detecting it and informing that the protective device is operating. As described later, the protective device 100 of the embodiment detects the surge current when a surge current occurs caused by a surge voltage in the communication wire or the power line and notifies it to a user through the LED 25.

More specifically, the protective device 100 of the embodiment further comprises a count display unit 27D for counting the detection times of surge currents and notifying a user of this count value, as described later.

Figure 2:
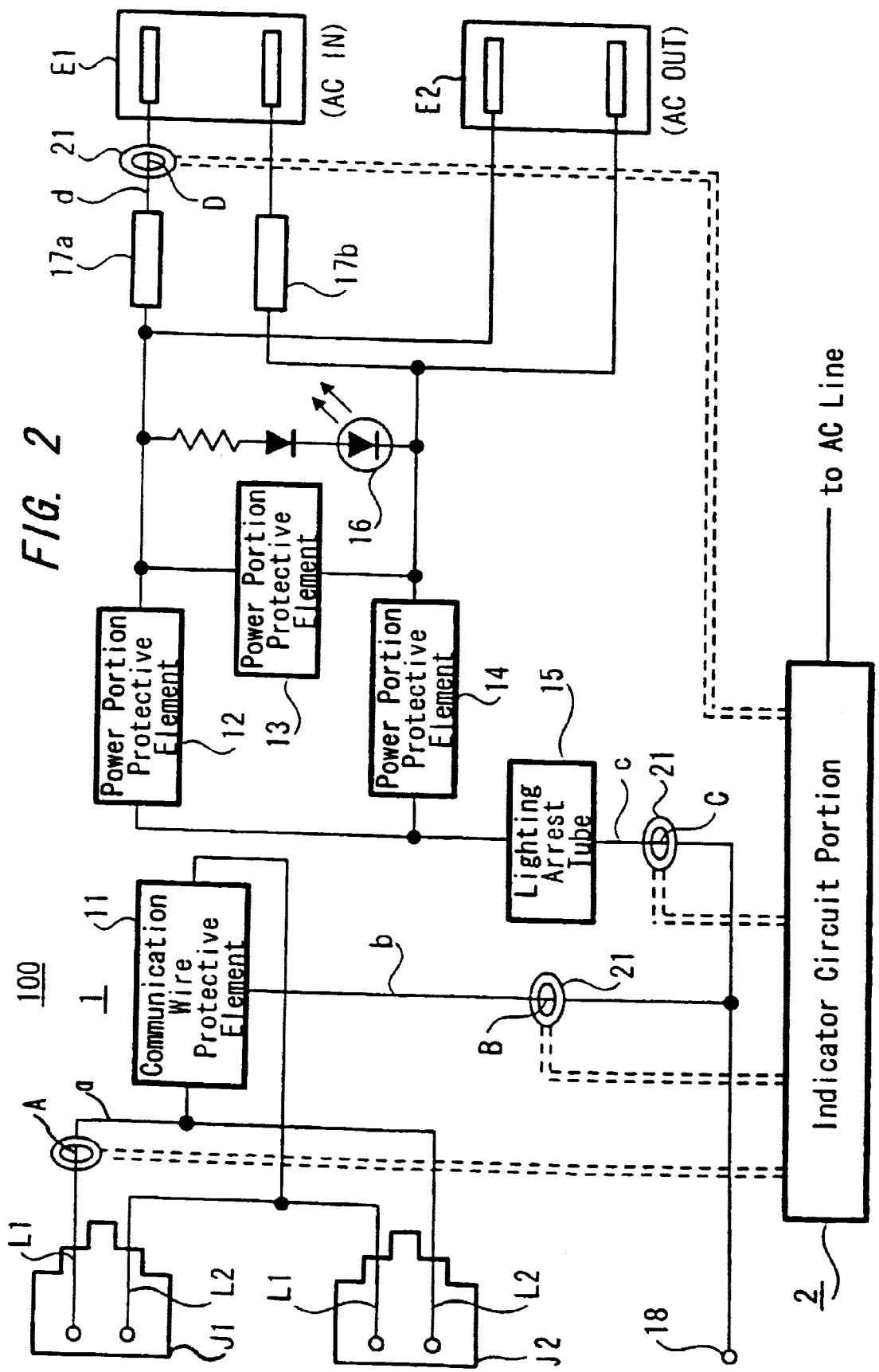
FIG. 2 is a view for describing the embodiment of the protective device according to the present invention.

FIG. 2 is a view for describing the protective device 100 more concretely. As illustrated in FIG. 1 and FIG. 2, the protective device 100 of the embodiment comprises the connection terminals J1 and J2 for a communication wire and the connection terminals E1 and E2 for a power line.

The protective device 100 of the embodiment is formed by a protective circuit portion 1 and an indicator circuit portion 2 in rough as illustrated in FIG. 2. The protective circuit portion 1 is formed by a communication wire protective element 11, a power portion protective elements 12, 13, and 14, a lighting arrest tube 15, the LED 16 for display of a current-carrying state, a temperature fuses 17a and 17b, and an earth terminal 18, as illustrated in FIG. 2.

The communication wire protective element 11 is a semiconductor surge protective element for carrying a surge current caused by a surge voltage to an earth terminal 18 or between the communication wires L1 and L2 when the surge voltage induced in the communication wires L1 and L2 is a predetermined level and above. More specifically, the SP Diode (product name) that is a constant-voltage typed surge protective device produced by Sankosha Ltd. or the SSPD (product name) that is a switch typed surge protective device, is used as the communication wire protective element 11.

The power portion protective elements 12, 13, and 14 are elements for carrying a surge current caused by a surge voltage induced in the power line to the earth terminal 18 or within the power line, and varister (semiconductor resistance element) or the like is used. The lighting arrest tube 15 carries a surge current caused by a surge voltage induced in the power line to the earth terminal 18 and insulates the power line from the earth terminal. The earth terminal 18 is to be grounded.

The communication wire protective element 11, the power portion protective elements 12, 13 and 14, and the lighting arrest tube 15 operate when a surge voltage of 200V (volt) to 300V (volt) is induced, thereby preventing a surge current flowing into the communication device 200 connected to the protective device 100.

[Path of Surge Current Flow]

In the protective device 100 of the embodiment, when a surge current occurs caused by a surge voltage induced in the communication wire and/or the power line by thunder, some cases may be considered as for a path of the surge current flow, as described later. In the below, a surge current flowing path will be described separately in the case where a surge current occurs in the communication wire and in the case where a surge current occurs in the power line.

[When a Surge Current Occurs in the Communication Wire]

At first, in the case where a surge current occurs in the communication wire, when the earth terminal 18 is grounded, in FIG. 2, the following three cases: (1), (2), (3) may be considered as for the surge current flowing path.

When a surge current occurs in the communication wire L1 or L2, there are the following two cases:

(1) where the surge current flows from the communication wire L1 or L2, the communication wire protective element 11, the earth terminal 18, to the ground in this order, and (2) where the surge current flows from the communication wire L1 or L2, the communication wire protective element 11, to the communication wire L2 or L1 in this order.

When a surge current occurs in the communication lines L1 and L2, similarly to the case of (1), (3) the surge current flows from the communication wire L1 or L2, the communication wire protective element 11, the earth terminal 18, to the ground in this order.

In the case where a surge current occurs in the communication wire and the earth terminal 18 is not grounded in FIG. 2, the following case (4) may be considered as for the surge current flowing path.

When a surge current occurs in the communication wire L1 or L2, (4) the surge current flows from the communication wire L1 or L2, the communication wire protective element 11, the lighting arrest tube 15, the power portion protective element 12 or 14, to the power line in this order. Also in the case where a surge current occurs in the communication wire L1 and the communication wire L2, the surge current flows in the same path as in the case(4).

[When a Surge Current Occurs in the Power Line]

The case where a surge current occurs in the power line will be described now. When a surge current occurs in the power line and the earth terminal 18 is grounded in FIG. 2, the following two cases, (5) and (6) may be considered as for the surge current flowing path.

When a surge current occurs in the power line, there are the following two cases:

(5) where the surge current flows from the power line, the fuse, the power portion protective element 12 or 14, the lighting arrest tube 15, the earth terminal 18, to the ground in this order, and (6) where the surge current flows from the power line, the fuse, the power portion protective element 13, the fuse, to the power line in this order.

When a surge current occurs in the power line and the earth terminal 18 is not grounded, the surge current flows within the power line similarly to the above mentioned case (6).

The protective device 100 of the embodiment is able to carry a surge current which occurs in the communication wire L1 and/or L2 to the ground, between the communication wires, or to the power line, thereby preventing it flowing to the communication device 200. Further, it can carry a surge current which occurs in the power line to the ground or within the power line, thereby preventing it flowing to the communication device 200.

Thus, the protective device 100 of the embodiment can surely protect the communication device 200 from a surge current. In the protective device 100 of the embodiment, the LED 16 lights up when power is supplied from the power line E through the connection terminal E1, thereby notifying a user that it is now in a current carrying state.

When a large surge current flows in the power line and at least one of the fuses 17a and 17b is broken, the LED 16 goes out, thereby notifying a user that the protective device 100 is broken due to the surge current and that the fuse must be exchanged with a new one.

Further, in the case where a surge current is not so large as to break the fuses 17a and 17b, or in the case where a surge current flows in the communication wire and the protective device 100 operates to protect a communication device connected to the communication wire and the power line, the protective device of the embodiment can notify a user of the above effect. That is, the protective device 100 can notify a user of a state of protecting the communication device 200 connected to itself when a surge current occurs in the communication wire and the power line.

The protective device 100 of the embodiment is designed to detect a surge current in four positions of the protective circuit portion 1, as described later, in order to detect the surge current which occurs in a communication wire and a power line surely.

Examining the surge current flowing paths of the above (1) to (6), it is found that a surge current flows in at least one of the four positions: A, B, C, and D shown in FIG. 2, in any path. More specifically, when a surge current occurs in the communication wire L1 and/or the communication wire L2 (in the cases of the above-mentioned (1) to (4)), the surge current flows in the position A and/or the position B. When a surge current occurs in the power line (in the cases of the above-mentioned (5) and (6), the surge current flows in the position C and/or the position D.

Accordingly, as long as a surge current is detected in the four positions: A, B, C, and D shown in FIG. 2, it can be detected in any case shown in (1) to (6). Therefore, the protective device 100 of the embodiment is designed to detect a surge current in the four positions: A, B, C, and D shown in FIG. 2.

When a rapidly increasing current, that is, a surge current is detected, a user can visually recognize that the protective device 100 operates to protect the communication device 200, by the LED 25 lit up for a constant hour.

Figure 3:
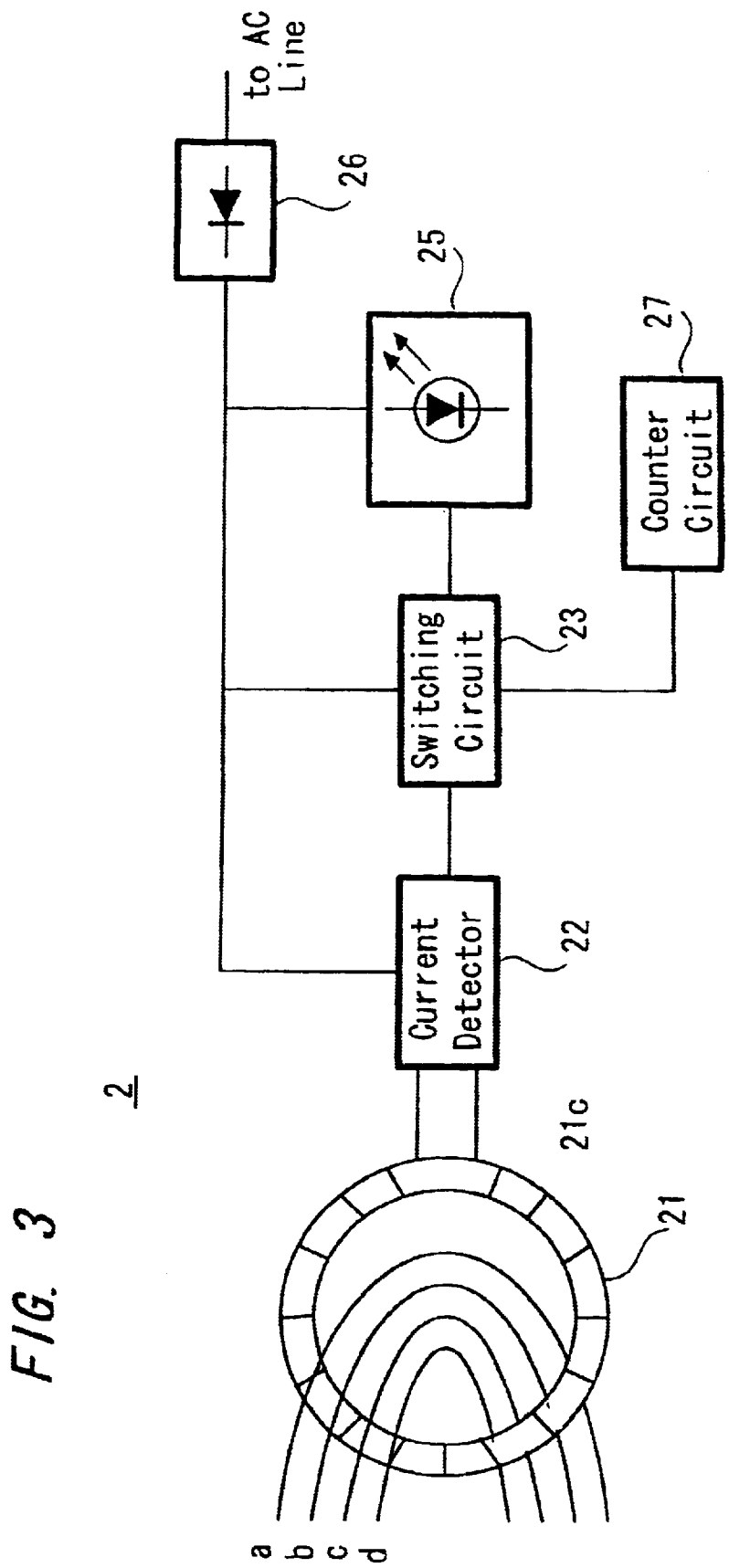
FIG. 3 is a view for describing an indicator circuit of the protective device shown in FIG. 2.

FIG. 3 is a view for describing the indicator circuit portion 2 of the protective device 100 of the embodiment. The indicator circuit portion 2 of the protective device 100 of the embodiment is designed to detect a surge current in the position A, the position B, the position C, and the position D shown in FIG. 2 by using one toroidal coil 21.

The toroidal coil 21 is formed by wrapping a wire around a ring core portion 21C, as illustrated in FIG. 3. A conductive wire a which connects one end portion of the connection terminal J1 with one end portion of the connection terminal J2 shown in FIG. 2 is extended and passed through the core portion 21C of the toroidal coil 21, as illustrated in FIG. 3, in order to detect a surge current in the position A shown in FIG. 2.

In the same way, in order to detect a surge current in the position B shown in FIG. 2, a conductive wire b which connects the communication wire protective element 11 with the earth terminal 18 shown in FIG. 2 is passed through the core portion 21C of the toroidal coil 21, as illustrated in FIG. 3. Further, in order to detect a surge current in the position C shown in FIG. 2, a conductive wire c which connects the lighting arrest tube 15 with the earth terminal 18 shown in FIG. 2 is passed through the core portion 21C of the toroidal coil 21, as illustrated in FIG. 3.

In order to detect a surge current in the position D shown in FIG. 2, a conductive wire d which connects one end portion of the connection terminal E1 for a power line with the fuse 17a shown in FIG. 2 is passed through the core portion 21C of the toroidal coil 21, as illustrated in FIG. 3.

Thus, the conductive wires a, b, c, and d are respectively extended and passed through the core portion 21C of the toroidal coil 21 in order to detect a surge current occurring in the respective positions A, B, C, and D in FIG. 2. As a result, when a surge current occurs caused by a surge voltage induced in the communication wire or the power line, the corresponding current flows through the toroidal coil 21 to a current detector 22.

Receiving a current from the toroidal coil 21, the current detector 22 converts the received current into a voltage and applies this voltage to a switching circuit 23. The switching circuit 23 is formed in a monostable multivibrator in this embodiment, and it forms a signal for keeping an indicator light circuit 24 provided with the LED 25 in the ON state (operating state) for a constant hour.

In the embodiment, a counter circuit 27 operating associated with the switching circuit 23 is connected to the switching circuit 23 of the indicator circuit portion 2. The counter circuit 27 is to count the times of changes from the OFF state to the ON state in the operation of the switching circuit 23.

When occurrence of a surge current is detected through the toroidal coil 21 and the current detector 22, the counter circuit 27 counts it and holds the times of occurrence of surge currents (the times of flowing surge currents). The counter value of the counter circuit 27 is notified to a user through the count display unit 27D as count value output means, as illustrated in FIG. 1.

The count display unit 27D is formed by using, for example, a LCD, a rotating count display mechanically formed, or the other display.

When a surge current occurs caused by a surge voltage induced in the communication wire or the power line connected to the protective device 100 of the embodiment, the toroidal coil 21 picks it up, and supplied it to the current detector 22. The current detector 22 converts the supplied current into a voltage and supplies it to the switching circuit 23, thereby turning the switching circuit 23 in an operating state to turn on the LED 25 of the indicator light circuit 24 for a constant hour by a signal from the switching circuit 23.

In the embodiment, a function as current change detecting means for detecting a surge current is realized by the toroidal coil 21 and the current detector 22, and a function as control means for controlling the indicator light circuit 24 is realized by the switching circuit 23. A function as notifying means is realized by the indicator light circuit 24 having the LED 25. In FIG. 3, the power circuit 26 is to supply power to each unit of the indicator circuit portion 2 after receiving the power from the power line (AC line).

Thus, when a surge current occurs, the present invention can detect it surely and light up the LED 25. Therefore, when a surge current, which may be not so large as to break a fuse, occurs in the communication wire or the power line, it can detect the surge current surely and notify a user that the protective device 100 protects the communication device 200 from the surge current.

A user can know that a surge current has occurred in an instant and he or she can also recognize that the protective device 100 operates properly to protect the communication device 200. Accordingly, it is not necessary for a user to worry about whether or not the protective device 100 operates to protect the communication device 200 properly, thereby providing a user with satisfaction, relief, and reliability on the protective device.

In the protective device 100 of the embodiment, the counter circuit 27 and the count display unit 27D serve to count how many times the occurrence of a surge current is detected and notify a user of this count value. Accordingly, a user can judge the validity of the protective device concretely by the detection times of the surge currents.

As illustrated in FIG. 2, the communication wire L and the power line E are both a two-wire line in the embodiment. However, it is only the conductive wire connected to the respective one end portions of the two-wired communication wire and the two-wired power line that is passed through the toroidal coil. This is why if the conductive wire connected to the both end portions of the two-wired communication wire and the conductive wire connected to the both end portions of the two-wired power line are passed through the toroidal coil 21, the whole surge current is compensated by an influence of a phase difference of each surge current respectively occurring there and the surge current cannot be detected in spite of occurrence of a surge current.

In the above-mentioned embodiment, as described by using FIG. 3, the LED 25 of the indicator circuit portion 2 is designed to automatically turn off after lighting up for a constant hour. However, it is not restricted to the structure. For example, when detecting a surge current, the LED 25 may be designed to flash for a constant hour. In this case, the switching circuit 23 may be formed in a flip-flop circuit which repeats the ON/OFF state.

Further, the protective device 100 may be provided with a reset key of turning on or flashing the LED 25 (shut-off instruction receiving means), and when a surge current occurs, the LED 25 may be kept lighting up and flashing until the reset key is operated. When the reset key is operated, the lighting LED 25 may be turned off, or the flashing LED 25 may be turned off.

Further, as illustrated in FIG. 1 and FIG. 2, the protective device 100 of the embodiment is provided with the LED 16 for informing a current-carrying state. The LED may be shared for informing a current-carrying state and for informing occurrence of a surge current. In other words, it is not necessary to provide with another LED for informing occurrence of a surge current separately.

When the LED for informing a current-carrying state also serves as the LED for informing occurrence of a surge current, the LED is designed to flash when detecting a surge current, thereby notifying a user of the current-carrying state and the surge current occurring state in a distinguishable way.

Alternatively, the occurrence of a surge current may be notified by a sound such as an alarm sound, not by the light-up of the LED. In this case, the indicator light circuit 24 of the indicator circuit portion 2 shown in FIG. 3 may be replaced with a sound unit for producing alarm or a predetermined sound.

In the above-mentioned embodiment, a surge current is detected in the four positions (portions): A, B, C, and D, as illustrated in FIG. 2. However, it is not restricted to this. A surge current may be detected in one portion and more depending on necessity. For example, a surge current may be detected only in the position B and the position C, or it may be detected only in the position B. Alternatively, it may be detected in many positions more than four. In the above-mentioned embodiment, although one toroidal coil is used to detect a surge current in the four positions, it is not restricted to the above. Individual toroidal coils may be arranged in a plurality of positions for detecting a surge current.

In the above-mentioned embodiment, although the description has been made in the case where the protective device 100 is of an adapter type, it is not restricted to the type. For example, a communication device provided with a protective device including the protective circuit portion 1 and the indicator circuit portion 2 shown in FIG. 2, in addition to various communication devices, may be formed.

For example, assuming that the protective device 100 shown in FIG. 2 is installed on a communication device as it is, a power circuit of the communication device is connected to the connection terminal E2 of the power line E, and a communication interface of the communication device is connected to the connection terminal J2 of the communication wire. Also when forming the communication device with the protective device installed thereon, it is possible to detect the occurrence of a surge current and notify a user that the protective device operates properly.

Although the description has been made in the case where the communication device is a telephone terminal as mentioned above, it is not restricted to the above. When using various communication devices connecting a communication wire to a power line, such as a personal computer with a facsimile machine, a TA (Terminal Adapter), a communication function built in, it is possible to apply the protective device according to the present invention and also form a communication device having such a protective function.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A protective device having a fuse and that connects a communication device to a communication wire and a power line and protects the communication device from a rapidly increasing current due to a rapid increase of voltage induced in the communication wire and/or the power line, comprising:

first informing means for indicating to a user an operation of the protective device when the protective device is connected to the power line;

current change detecting means for detecting a surge in the form of a rapid increase of current that occurs in the communication wire and/or the power line and that does not break the fuse;

second informing means for indicating to the user that the current change detecting means has detected a surge in the communication wire and/or power line; and control means for controlling the operation of said second informing means based on a surge detection output from said current change detecting means.

2. The protective device according to claim 1, wherein said current change detecting means has a toroidal coil and the communication wire and the power line corresponding to portions where occurrence of a rapid increase of current is to be detected are passed through a core of the toroidal coil.

3. The protective device according to claim 1, wherein said first and second informing means are formed by light-emitting diodes, and said control means controls the light-emitting diode forming said second informing means to light up for a period of an hour when surge in the form of a rapid increase of current is detected by said current change detecting means.

4. The protective device according to 1, wherein said second informing means is formed by a light-emitting element, and further comprising:

instruction receiving means for receiving a shutoff instruction for said second informing means from a user, and wherein said control means controls the light-emitting element to light up until receiving the shutoff instruction through said instruction receiving means.

5. The protective device according to claim 1, further comprising:

count means for counting a number of times a surge in the form of a rapid increase of current is detected by said current change detecting means; and count value output means for supplying a visible count value output from said count means.

6. A communication device comprising:

a connection end of a communication wire to which a communication line is connected;

a connection end of a power line supplying power through a fuse;

a protective circuit that protects the communication device from a rapid increase of current caused by a rapid increase of voltage induced in the communication wire and/or the power line and that does not break the fuse;

first informing means for indicating to a user an operation of a protective function when the communication device is connected to the power line;

current change detecting means for detecting a surge in the form of a rapid increase of current that occurs in the communication wire and/or the power line and that does not break the fuse;

second informing means for indicating to the user that the current change detecting means has detected a surge in the communication wire and/or power line; and control means for controlling an operation of said second informing means based on a surge detection output from said current change detecting means.

7. The communication device according to claim 6, wherein said current detecting means has a toroidal coil and portions of the communication wire and the power line, corresponding to portions where occurrence of a rapid increase of current is to be detected, are passed through a core of the toroidal coil.

8. The communication device according to claim 6, wherein said first and second informing means are formed by light-emitting diodes, and said control means controls the light-emitting diode forming said second indicating means to light up for a period of an hour when surge in the form of a rapid increase of current is detected by said current change detecting means.

9. The communication device according to claim 6, in which said second informing means is formed by a light-emitting element, and further comprising:

instruction receiving means for receiving a shutoff instruction for said second informing means from the user, and wherein said control means controls the light-emitting element to light up until receiving the shutoff instruction through said instruction receiving means.

10. The communication device according to claim 6, further comprising:

count means for counting a number of times a surge in the form of a rapid increase of current is detected by said current change detecting means; and count value output means for supplying a visible count value from said count means.

* * * * *